United States Patent [19]

Mikhaeil-Boules et al.

[11] Patent Number: 5,112,116

[45] Date of Patent: *May 12, 1992

[54] ANTI-LOCK BRAKING SYSTEM WITH ELECTROMAGNETIC BRAKE

[75] Inventors: Naila Mikhaeil-Boules, Troy; Robert J. Hammersmith, Rochester Hills; Kevin G. Leppek, Troy, all of Mich.; Paul D. Wilkey, Vandalia; Thomas H. Gardner, Englewood, both of Ohio; Dennis J. Ricker, Huber Heights; James J. Kowalik, West Carrollton, both of Ohio

[73] Assignee: General Motors Corporation, Detroit, Mich.

[*] Notice: The portion of the term of this patent subsequent to Mar. 19, 2008 has been disclaimed.

[21] Appl. No.: 669,144

[22] Filed: Mar. 14, 1991

Related U.S. Application Data

[63] Continuation of Ser. No. 352,971, May 17, 1989, Pat. No. 5,000,523.

[51] Int. Cl.⁵ .............................................. B60T 8/42
[52] U.S. Cl. .............................................. 303/115 EC
[58] Field of Search ............... 303/113, 115, 116, 110, 303/119, 93, 10, 115 EC; 180/179

[56] References Cited

U.S. PATENT DOCUMENTS

| | | | |
|---|---|---|---|
| 3,420,580 | 1/1969 | Dymond | 303/113 |
| 3,790,225 | 2/1974 | Wehde | 303/113 |
| 4,308,943 | 1/1982 | Gierhart | 198/399 |
| 4,653,815 | 3/1987 | Agarwal et al. | 303/100 |
| 4,659,970 | 4/1987 | Melocik | 318/269 |
| 4,684,838 | 8/1987 | Casanova | 188/71.1 |
| 4,969,756 | 11/1990 | Villec et al. | 303/DIG. 4 |

FOREIGN PATENT DOCUMENTS 2188111 9/1987 United Kingdom ............... 303/115

Primary Examiner—Matthew C. Graham
Attorney, Agent, or Firm—Ernest E. Helms

[57] ABSTRACT

A vehicle wheel anti-lock braking system (ABS) is provided including a master cylinder and a wheel brake. A controller cognizant of the rotational condition of the wheel provides a signal when the wheel condition is within preset parameters. An actuator frame is also provided having a bore fluidly communicating with the wheel brake. A piston is mounted within the bore for providing a variable control volume in communication with the wheel brake and for modulating the pressure therein. A reversible motor reciprocally powers the piston. The motor has a rotor with a connected disc. A friction surface is provided for engagement with the disc to lock the position of the piston. A plunger is also provided to urge the friction surface into engagement with the disc. An electromagnetic core, responsive to a signal by the controller, moves the plunger to a position allowing cessation of engagement between the friction surface and the disc thereby allowing rotation of the motor and movement of the piston.

11 Claims, 1 Drawing Sheet

ANTI-LOCK BRAKING SYSTEM WITH ELECTROMAGNETIC BRAKE

This is a continuation of application Ser. No. 07/352971 filed on May 17, 1989, now U.S. Pat. No. 5,000,523.

FIELD OF THE PRESENT INVENTION

The field of the present invention is that of anti-lock braking systems (ABS) for automotive vehicles.

DISCLOSURE STATEMENT

Anti-lock braking systems typically modulate the pressure delivered to a vehicle wheel brake to prevent the vehicle wheel from locking up in the braking condition. Two prior anti-lock braking systems are shown in commonly assigned U.S. Pat. Nos. 4,653,815 and 4,756,391. In both of the aforementioned systems, an electronic controller signals a motor which is gearably engaged with a driven member which is in turn threadably engaged with an actuator piston. Piston movement is used to modulate the pressure delivered to the vehicle wheel brake.

SUMMARY OF THE INVENTION

The present invention provides a vehicle anti-lock braking system which is an alternative to the aforementioned anti-lock braking systems. To reduce the space envelope of the aforementioned systems, the present invention in a preferred embodiment provides a piston which is attached to a non-rotative nut which is threadably engaged by a power screw rather than having the piston attached to a non-rotative screw which is engaged by a rotative nut. The above modification allows the present invention to provide anti-lock braking systems wherein the components are smaller and wherein there is less rotative mass, thereby greatly reducing the angular inertia of the system.

Furthermore, in a preferred embodiment, the present invention provides an actuator with a check valve providing an alternative flow pattern from the master cylinder to the wheel brake cylinder. The check valve is opened by the piston itself. Therefore, possible malfunctions in the isolation valve will not prevent operator control of the vehicle brakes since there is an alternative flow path to the wheel brake.

To maximize reaction speed, a high efficiency thread is utilized between the power screw and the non rotative nut, therefore, pressure within the actuator can back drive the piston. The present invention is configured in such a manner that the piston is at its extreme position opens the check valve when the system is not in the ABS mode of operation. The piston can be held with an inefficient thread, however, it has been found preferable to use an efficient thread (to lower current required by the motor). Therefore, to use an efficient thread, there must be some means of holding the piston at its extreme position when it is exposed to master cylinder pressure, but not within the ABS mode wherein the motor is being powered. Space limitation under the hood of an auto require that the solution to the above need take up as less space as possible.

One method to prevent back drive of the piston is to use a one-way spring type clutch brake which restrains movement of the motor. Such an anti-lock braking system is disclosed in copending U.S. Pat. No. 5,011,257 Matouka et al filed on May 17, 1989. The present invention provides an anti-lock braking system which is an alternative to that found in Matouka et al.

It is an object of the present invention to provide an anti-lock braking system.

Other objects and advantages of the present invention can become more apparent to those skilled in the art as the nature of the invention is better understood from the accompanying drawings and a detailed description.

DETAILED DESCRIPTION OF THE DRAWINGS

Figure 1:
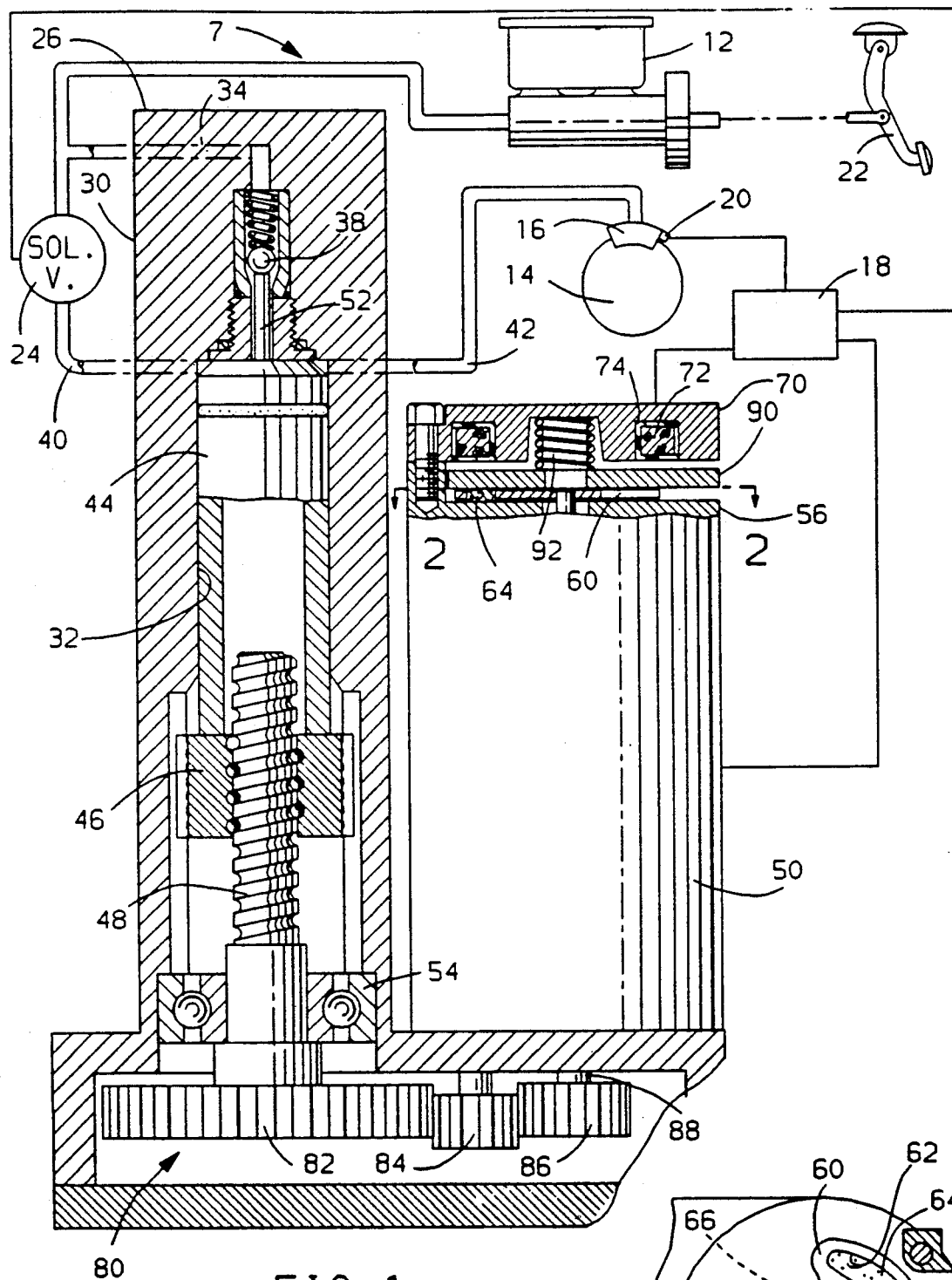
FIG. 1 is a schematic view of a preferred embodiment of the present invention.
Figure 2:
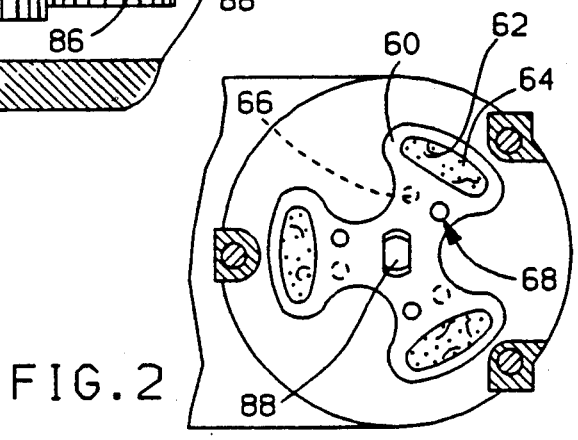
FIG. 2 is a view taken along line 2—2 of FIG. 1.

The vehicle wheel anti-lock braking system 7 of the present invention includes a master cylinder 12 for supplying pressurized fluid. Connected on the wheel 14 and schematically shown, is a fluid activated wheel brake cylinder 16 (hereinafter referred to as a wheel brake) which receives pressurized fluid from the master cylinder for restraining rotational movement of the wheel 14. The wheel brake 16 may be a conventional drum or disc type vehicle brake.

An ABS electronic controller 18 is also provided. A sensor 20 (tied into the controller 18) in the vehicle wheel brake 20 determines rotational speed of the wheel 14. A sensor (not shown) determines whether or not the brake pedal of the vehicle is being operated and also reports the information to the controller 18. The ABS controller 18 will be cognizant of the rotational condition of the wheel and will provide an appropriate signal in response thereto. The signal will place the braking system 7 in an ABS mode of operation if the condition of the wheel 14 is within preset parameters.

A normally open solenoid valve 24 when activated to a closed position in response to a signal given by the controller 18 functions as an isolation valve to prevent fluid communication between the master cylinder 12 and the wheel brake 16. An actuator 28 is provided having an actuator frame 30 with a longitudinal bore 32. (As shown, the actuator 28 is connected with one wheel brake but a vehicle may have actuators connected to more than one wheel brake or actuators for each single wheel for individualized ABS response.) The longitudinal bore 32 has a first fluid connection 42 allowing fluid communication with the wheel brake 16 and the longitudinal bore 32 also has fluid communication with the master cylinder 12 when the solenoid valve 24 is not activated to the closed position via passage 40. Additionally, as shown, the longitudinal bore has a second or alternative fluid communitative path with the master cylinder 12 as shown the bore 32 is midstream of the solenoid valve 24 and passages 42. Fluid flow passes over a transverse slot (not shown) of a piston 44. However the solenoid valve 24 could directly tie into the wheel brake 16 and passage 42 could "T" into that line. The alternative path 34 has a check valve 38 whose function will be described later. The check valve 38 allows delivery of fluid back to the master cylinder 12 whenever the wheel brake 16 has a pressure greater than that in the master cylinder 16, therefore, the braking system 7 is sensitive to an operator relieving the brake by removing his or her foot therefrom without any needed input from the controller.

The piston 44 is slidably and sealably mounted within the longitudinal bore 32. Movement of the piston 44 provides a variable control volume in communication with the wheel brake 16, thereby modulating the pressure therein. A nut 46 is operatively associated and connected with the piston 44 and the nut 46 is slidably mounted within the longitudinal bore 32 in a non-rotative fashion.

A power screw 48 projects into the nut and is threadably engaged therewith in an efficient manner. The power screw has a fixed rotational axis with respect to the actuator frame 30. Powering the power screw is a reversible DC motor 50 which is responsive to the signals given to it by the controller 18. In the position shown, for normal braking operation, the piston 44 is held at the extreme up position and must be held within a tolerance of 3/100 of an inch to maintain the check valve 38 in the open position via the rod 52 (tolerance shown in FIG. 1 greatly enlarged for purposes of illustration).

The power screw is connected to a gear train 80 which is in turn connected also with the motor 50. The power screw is mounted by a bearing 54 and has a first large gear 82 connected to the end thereto. The first large gear 82 meshes with an idler gear 84 which in turn meshes with a smaller pinion gear 86. The pinion gear axially floats on a rotor 88 of the motor and is held on by a spring clip not shown.

The power screw 48 along with the gear train 80 and the non-rotative nut 46 provide the means to reciprocally move the piston 44 within the longitudinal bore 32 and the motor 50 is torsionally connected via the gear train 80 to move the piston 44. Surrounding the motor 50 is a housing 56.

On the opposite end of the housing 56 away from the rotor 88 connection with the pinion 86 is a three-lobe disc 60. The three-lobe disc 60 is connected with an end of the rotor 88. The disc 60 has three generally oval apertures 62 geometrically spaced. Inserted within these apertures are brake pads 64. The brake pads preferably will be a canvas phenolic resin impregnated laminate which tends to provide the high levels durability in usage.

The disc 60 (typically fabricated out of stainless steel) also has towards its middle portion a series of geometric dimples 66 68 which are stamped out. Three dimples 66 are pressed outward in a direction towards the motor housing 56 and three dimples 68 are pressed outward in a direction away from the motor housing 56. Therefore, when the motor 50 is turning during operation of the brake system 7, the dimples 66 tend to prevent the outer portions of the disc 60 from contacting the motor housing 56 thereby reducing friction with the same.

The plunger 90 which is located above the disc 60 and the top surface of the motor housing 56 cooperate to provide friction surfaces for engagement with the disc 60 to restrain rotation thereof, thereby restraining motion of the piston 46 within the longitudinal bore 32. As mentioned previously, the plunger 90 is biased in this instance by a coil spring 92 to a position to urge the friction surfaces into engagement with the disc 60.

Above the disc 60 is an electromagnetic core 70 which is responsive to a signal given by the controller 18 to move the plunger 90 to a position allowing for removal of engagement of the friction surfaces with the disc 60, and thereby allowing movement of the piston 46 within the longitudinal bore 32. To minimize the weight of the system and also to minimize the space displacement of the system, it is desirable to keep the electromagnetic brake as small as possible. Also it is desirable to keep the air gap as small as possible between the core 70 and the plunger 90 to provide a fast response typically in the area of 5 to 8 milliseconds. To keep eat buildup down, current should be minimized by keeping resistance high. However, a fast response is provided by a low resistance which is also provided by as few coil turns as possible. The nature of the electromagnetic brake is such that the initial separation of the plunger 90 from the piston 46 requires the highest current. However, as the plunger 90 moves away from the disc 60 current can be reduced. Therefore, a dual level current driver circuit is utilized to power the coil by duty cycling the voltage in an 8 to 20 kilohertz range. Thereby reducing the current to lower level when the electromagnetic plunger 70 has been urged away from the open disc 60.

As shown, the coil 72 is mounted within the electromagnetic core 70 in a plastic snap-in bobbin 74. It has been shown to be preferable that the stator electromagnetic core (sometimes referred to as the stator) be comprised of a phosphorous 45% sintered metal having a density of 6.8 to 7.2 grams per cubic centimeter to help reduce eddy currents. In operation, typically the air gap at its maximum will be in the range of 10/1000 of an inch.

The thickness of the brake pad 64 (sometimes referred to as shoes) will be greater than that of the disc 60 even with the added dimension of the dimples 66 and 68. Therefore, when the plunger is released 90 into a position to braking the motor 50 (normal condition, no current in the coil 72), the pads 64 will be compressed by the plunger 91 against the motor housing 56, and a dual braking will be achieved. This is much more efficient than utilizing a pad 64 which will be placed on the underside of the disc 60 which would only engage with the top of the motor housing 56.

The disc 64 are captured and retained (in a direction parallel to the disc 60) within the aperture 62 and can freely slide transversely to the surface of the disc 60.

Since the weight of the disc 60 and rotor 88 are not on the pads 64 during normal operation of the motor 50, there is very little friction on the pads 64 during motor 50 rotation.

While one embodiment of the present invention has been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A vehicle wheel anti-lock braking system (ABS) comprising;
   master cylinder means for supplying pressurized fluid;
   a wheel brake receiving pressurized fluid from said master cylinder means and for restraining rotational movement of said wheel;
   an ABS controller cognizant of the rotational condition of said wheel and providing a signal when said wheel condition is within preset parameters;
   an actuator frame having a longitudinal bore with first means of fluid communication with said wheel brake;
   check valve means to allow fluid communication between said master cylinder means and said wheel brake when the pressure in said wheel brake is lower than the pressure within said master cylinder means via said longitudinal bore;

a piston slidably sealably mounted within said longitudinal bore for providing a variable control volume in communication with said wheel cylinder and thereby modulating the pressure therein;

means to reciprocally move said piston;

a reversible motor torsionally connected with said means to reciprocally move said piston, said motor having a rotor with a connected disc;

a friction surface for engagement with said disc to restrain rotation of said rotor to lock the position of said piston;

a plunger biased into a position to urge said friction surface into engagement with said disc; and an electromagnetic core responsive to a signal by said controller to move said plunger to a position allowing removal of engagement between said friction surface and said disc allowing rotation of said motor and movement of said piston.

2. A vehicle wheel anti-lock braking system (ABS) comprising;

master cylinder means for supplying pressurized fluid;

a wheel brake receiving pressurized fluid from said master cylinder means and for restraining rotational movement of said wheel;

an ABS controller cognizant of the rotational condition of said wheel and providing a signal when said wheel condition is within preset parameters;

an actuator frame having a longitudinal bore with first means of fluid communication with said wheel brake;

a piston slidably sealably mounted within said longitudinal bore for providing a variable control volume in communication with said wheel brake and thereby modulating the pressure therein;

means to reciprocally move said piston;

a reversible motor torsionally connected with said means to reciprocally move said piston, said motor having a rotor with a connected disc;

a friction surface for engagement with said disc to restrain rotation of said rotor to lock the position of said piston;

a plunger biased into a position to urge said friction surface into engagement with said disc; and an electromagnetic core responsive to a signal by said controller to move said plunger to a position allowing removal of engagement between said friction surface and said disc allowing rotation of said motor and movement of said piston.

3. An ABS system as described in claim 2 wherein said means to reciprocally move said piston includes a nut slidably and non-rotatably mounted within said longitudinal bore and a power screw with a rotational axis fixed with respect to said longitudinal bore, said power screw being torsionally connected with said motor via a gear train.

4. An ABS system as described in claim 2 wherein said plunger and a surface adjacent to said motor are separated by said disc and both of said surfaces function to provide a friction surface.

5. An ABS system as described in claim 2 wherein a voltage supplied to said motor is duty cycled to provide a dual level driver wherein said duty cycle is at its maximum when said plunger is in contact with said disc and wherein when said plunger is removed from said disc, said electromagnetic core is driven at a lower duty cycle of voltage to minimize the amperage of said electromagnetic core.

6. An ABS system as described in claim 2 wherein said disc has brake pads.

7. An ABS system as described in claim 6 wherein one of said brake pads are comprised of a canvas phenolic laminate.

8. An ABS system as described in claim 2 wherein said disc has surface rising to prevent the outer portions of said disc from touching said friction when said motor is rotating.

9. An ABS system as described in claim 2 wherein said core is phosphorous iron sintered material.

10. An ABS system as described in claim 4 wherein said disc has brake pads and said pads float within an aperture of said disc.

11. A vehicle wheel braking system comprising;

master cylinder means for supplying pressurized fluid;

a wheel brake receiving pressurized fluid from said master cylinder means and for restraining rotational movement of said wheel;

an actuator frame having a longitudinal bore with first means of fluid communication with said wheel brake;

a piston slidably sealably mounted within said longitudinal bore for providing a variable control volume in communication with said wheel brake and thereby modulating the pressure therein;

means to reciprocally move said piston;

a reversible motor torsionally connected with said means to reciprocally move said piston, said motor having a rotor with a connected disc;

a friction surface for engagement with said disc to restrain rotation of said rotor to lock the position of said piston;

a plunger biased into a position to urge said friction surface into engagement with said disc; and an electromagnetic core responsive to a signal to move said plunger to a position allowing removal of engagement between said friction surface and said disc allowing rotation of said motor and movement of said piston.

* * * * *